United States Patent
Tonks et al.

(10) Patent No.: US 11,187,786 B2
(45) Date of Patent: Nov. 30, 2021

(54) ARRAY AND MODULE CALIBRATION WITH DELAY LINE

(71) Applicant: Raytheon Company, Waltham, MA (US)

(72) Inventors: Debra J. Tonks, Andover, MA (US); Stephen M. Sparagna, Milton, MA (US); William Kennedy, Boston, MA (US); David A. Ringheiser, Carlisle, MA (US); Jack Lee, Sudbury, MA (US)

(73) Assignee: Raytheon Company, Waltham, MA (US)

( * ) Notice: Subject to any disclaimer, the term of this patent is extended or adjusted under 35 U.S.C. 154(b) by 169 days.

(21) Appl. No.: 16/445,885

(22) Filed: Jun. 19, 2019

(65) Prior Publication Data

US 2020/0049798 A1    Feb. 13, 2020

Related U.S. Application Data

(63) Continuation of application No. 14/955,728, filed on Dec. 1, 2015, now Pat. No. 10,371,798.

(51) Int. Cl.
*G01S 7/40* (2006.01)
*G01S 13/02* (2006.01)

(52) U.S. Cl.
CPC .......... *G01S 7/4004* (2013.01); *G01S 7/4008* (2013.01); *G01S 7/4021* (2013.01); *G01S 2013/0245* (2013.01)

(58) Field of Classification Search
CPC .... G01S 7/4004; G01S 7/4008; G01S 7/4021; G01S 2013/0245
See application file for complete search history.

(56) References Cited

U.S. PATENT DOCUMENTS

| 5,353,033 | A | 10/1994 | Newberg et al. |
| 5,412,414 | A | 5/1995 | Ast et al. |
| 5,682,165 | A * | 10/1997 | Lewis ............ H01Q 3/267 342/174 |
| 8,754,811 | B1 | 6/2014 | Uscinowicz et al. |
| 9,360,549 | B1 | 6/2016 | Liu |

OTHER PUBLICATIONS

International Search Report and Written Opinion from related PCT Application No. PCT/US2016/064152 dated Mar. 13, 2017.
Lee et al., "Photonic Wideband Array Antennas," IEEE Transactions on Antennas and Propagation, IEEE Service Center, Piscataway, NJ, US, vol. 43, No. 9, Sep. 1, 1995, pp. 966-982, XP000522589.

* cited by examiner

*Primary Examiner* — Matthew M Barker
(74) *Attorney, Agent, or Firm* — Burns & Levinson, LLP; Joseph M. Maraia

(57) ABSTRACT

An apparatus and method for enhanced calibration of radar at the module level supports dual polarization and array calibration and alignment without the use of external test equipment. Utilizing a delay line, loop back capability at the module level allows existing receiver exciter subsystem to be used for calibration. This approach eliminates the need for manual array calibration using external RF monitor subsystem or external test antennas.

11 Claims, 12 Drawing Sheets

ARRAY AND MODULE CALIBRATION WITH DELAY LINE

CROSS-REFERENCE TO RELATED APPLICATIONS

This application is a continuation claiming priority from co-pending U.S. patent application Ser. No. 14/955,728 filed Dec. 1, 2015 and entitled "Array and Module Calibration with Delay Line," the entire contents of which is incorporated by reference herein for all purposes.

BACKGROUND

Current ultra-high frequency early-warning radar (UEWR) systems including phased array antennas are deployed in several locations around the world and have been operated by the United States military for decades. A phased array antenna includes numerous radio frequency (RF) radiating elements each connected in an assembly of solid state electronics which permits transmission and reception of RF signals. The assembly is termed a solid state module (SSM). For UEWR, each of 32 RF SSMs are fed by sub-array modules. Beams can be formed by shifting the phase of signals emitted from each radiating element to provide constructive and destructive interference. Each antenna element is delayed by the correct amount so that a wave front arriving from a given direction is aligned to receive the signals or the energy is directed to transmit signals. Each SSM includes a set of selectable for phase adjustments for transmit and receive beam steering in and amplitude for receive array pattern shaping. Performance of a phased array radar system is strongly dependent on the calibration of signal transmission lines in and between the RF modules and sub-array modules.

Calibration of phased array radar systems generally involves RF alignment at the sub-array level and the element level. In current UEWR systems, sub-array calibration involves alignment of transmit paths and receive paths for up to 80 sub-arrays. Elements of current UEWR systems are not calibrated in-situ. Rather, element calibration involves factory alignment of the modules.

Sub-arrays of UEWR systems have heretofore been calibrated manually by technicians who make manual adjustments to the sub-array line lengths based on RF measurements. Sub-array level alignment is performed by physically adjusting the line lengths using built in trimmers based on external measurement equipment, such as a special purpose radio frequency monitor (RFM) subsystem, for example.

Referring to FIG. 1, a prior art UEWR system 100 includes up to 80 sub-arrays. Each sub-array includes a sub-array driver assembly (SDA) 102. Each SDA 102 distributes RF signals from a single line 123 into four separate lines 104 to transmit signals and combines received signals from the four separate lines 104 onto the single line 123. The transmit signal is separated from the receive signal with the circulator 121. Each of four lines 104 is connected to a 1:8 splitter/combiner 106 which supplies/receives RF signals from eight solid state modules (SSM) 108. A total of 32 SSMs 108 are serviced with one SDA 102.

According to an aspect of the present disclosure, each SDA 102 also includes a receive path line 118. The receive path lines 118 are coupled to receive beam former (RBF) circuitry 107 and receiver circuitry 109.

To align the SDA 102 for receiving, the traditional method involves configuring an RF Monitor Injection (RFM) 116 sub-system to inject a known signal to the SDA 102. Each of the sub-array lines to a common receiver is measured, and their lengths are adjusted manually to achieve alignment. Similarly, transmit lines which supply RF signals to each SDA 102 are aligned by measuring the phase of the RF signal using the RFM 116 in a receive capacity. With the current calibration system, measurements are performed manually with external equipment, and adjustments are made physically using a bank of line stretchers.

Using the current method, the front end of the radar, which is beyond the RFM 116, cannot be calibrated. Rather, alignment of individual antenna elements, solid state modules 108, and cabling is performed by controlling manufacturing tolerances.

Thus, the traditional method of calibrating radar involves costly time consuming manual operations, and is limited in its ability since it cannot correct for all errors in the RF path to the element. The limited calibration accuracy limits sensitivity and tracking performance of radar systems. Compensation with additional SSMs 102 further adds costs associated with using the traditional method.

Future radar technology upgrades may include digital beamforming and other improvements. Such technology upgrades may require periodic real time calibrations, which are not possible using the present manual RFM calibration methods.

SUMMARY

Aspects of the present disclosure include an apparatus and method for automatic calibration of radar systems. The disclosed calibration apparatus and methods may be implemented in upgrade modules such as solid state modules (SSM) and subarray driver assemblies (SDA) of the improved radar systems, for example, to improve the accuracy of the radar and reduce the amount of man power needed to maintain the radar. The disclosed calibration method can replace the present manual methods for calibrating radar systems and permits calibration of the radar front end, which is not possible with the present method.

The first phase in the disclosed calibration method is alignment of the transmit RF paths to the subarray driver. This is accomplished using time domain reflectometry based on a 30 MHZ Linear Frequency Modulated (LFM) waveform. In this phase, three measurements are performed using switched delay lines to isolate the return of the sub-array under test from the rest of the subarrays and also to characterize the delay of the circulator path. In a second phase of the disclosed calibration method, the transmit path from the output of the subarray driver assembly (SDA) through the solid state module (SSM) is aligned. This is accomplished by sending a 1.5 MHz LFM waveform through the SDA and through the SSM. The SSM output is passed to the SSM calibration loop for this measurement. The signal is delayed in the SSM so that it will not interfere with the leakage return from the SDA. The third phase of calibration is receive alignment. This is accomplished with a 1.5 MHz signal that is passed through the calibration loop in the SSM through the receiver ports. A third electrical length in the radar apparatus of a sub-array receive path from the first radar input port through the circulator in the sub-array driver module to receiver circuitry is measured.

According to an aspect of the present disclosure, the transmit path between the sub-array driver module and the array element module is adjusted by controlling the commanded phase setting in the array element module on transmit, and the receive path between the sub-array driver module and the array element module is adjusted by controlling the SSM phase setting on receive. The SSM is capable of receiving digital control and is adjustable with calibration updates.

According to another aspect of the present disclosure, the first electrical length is measured for a plurality of the sub-array transmit paths in the radar, the second electrical length is measured for a plurality of the sub-array transmit paths through the circulator in the sub-array driver module, the third electrical length is measured for a plurality of the sub-array receive paths in the radar, the fourth electrical length is measured for a plurality of the transmit paths between the sub-array driver module and the array element module of the radar, and the fifth electrical length is measured for a plurality of the receive paths between the sub-array driver module and the array element module of the radar.

According to another aspect of the present disclosure, the transmit path between the sub-array driver module and the respective array element module for each of the plurality of transmit paths is automatically adjusted by controlling the phase shift during transmit. The receive path between the sub-array driver module and the array element module for each of the plurality of receive paths is automatically adjusted by controlling the phase shift during receive in a respective array element module.

According to another aspect of the present disclosure, the first electrical length in the radar apparatus of the sub-array transmit path from a first radar signal input port to a sub-array driver module is measured when the sub-array transmit path from the first radar signal input port to the sub-array driver module is terminated in by a first short circuit in the sub-array driver module. The second electrical length in the radar apparatus of the sub-array transmit path from the first radar signal input port through a circulator in the sub-array driver is measured when a transmit/receive path between the sub-array driver module and an array element module of the radar is terminated with a second short circuit in the circulator, and when the sub-array receive path from the first radar input port through the circulator in the sub-array driver module to receiver circuitry is terminated with a third short circuit. The third electrical length in the radar apparatus of the sub-array receive path from the first radar input port through the circulator in the sub-array driver module to receiver circuitry is measured when the transmit/receive path between the sub-array driver module and an array element module of the radar is terminated with a second short circuit in the circulator.

According to another aspect of the present disclosure, the second short circuit and third short circuit are configured to provide a first delay of 45 nanosecond one way in a reflected measurement signal on the sub-array transmit path from the first radar signal input port through a circulator in the sub-array driver module path in response to an injected test signal on the first radar input port having a frequency bandwidth of 30 MHz. The third short circuit is configured to provide a first delay of 45 nanosecond one way in a reflected measurement signal on the sub-array receive path from the first radar input port through the circulator in the sub-array driver module path in response to the injected test signal on the first radar input port.

Another aspect of the present disclosure includes an apparatus for calibrating radar. The apparatus includes a sub-array driver module coupled to an input port of the radar, a plurality of array element modules coupled to the sub-array driver module, and a controllable delay in each of the plurality of array element modules.

An embodiment of the apparatus includes a plurality of sub-arrays, wherein each of the sub-arrays includes a respective sub-array driver module. The embodiment also includes a plurality of sub-array transmission lines. Each of the sub-array transmission lines is configured for selectively coupling the input port of the radar to a respective one of the sub-array driver modules. The embodiment also includes a plurality of receive path transmission lines. Each of the receive path transmission lines configured for selectively coupling receiver circuitry to a respective one of the sub-array driver modules.

According to an aspect of the present disclosure, the sub-array module includes a first controllable switch. The first controllable switch is configured for selectively coupling a selected one of the sub-array driver modules to the input port of the radar. In an embodiment, the sub-array module also includes a second controllable switch. The second controllable switch configured for selectively coupling the selected one of the sub-array driver modules to a selected one of the plurality of array element modules. According to an aspect of the present disclosure, the sub-array driver module may also include a third controllable switch. The third controllable switch is configured for selectively coupling the selected one of the sub-array driver modules to the receiver circuitry.

According to an aspect of the present disclosure, each of the sub-array modules includes a circulator. A first controllable short circuit in the circulator is configured for terminating a first transmission line between the input port and the sub-array driver module. A second controllable short in the circulator is configured for terminating a second transmission line between the sub-array driver module and a selected one of the plurality of array element modules. The second controllable short is configured for providing a first delay. A third controllable short in the circulator is configured for terminating a third transmission line between the sub-array driver module and a receiver circuit. Third controllable short configured for providing a second delay.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Figure 1:
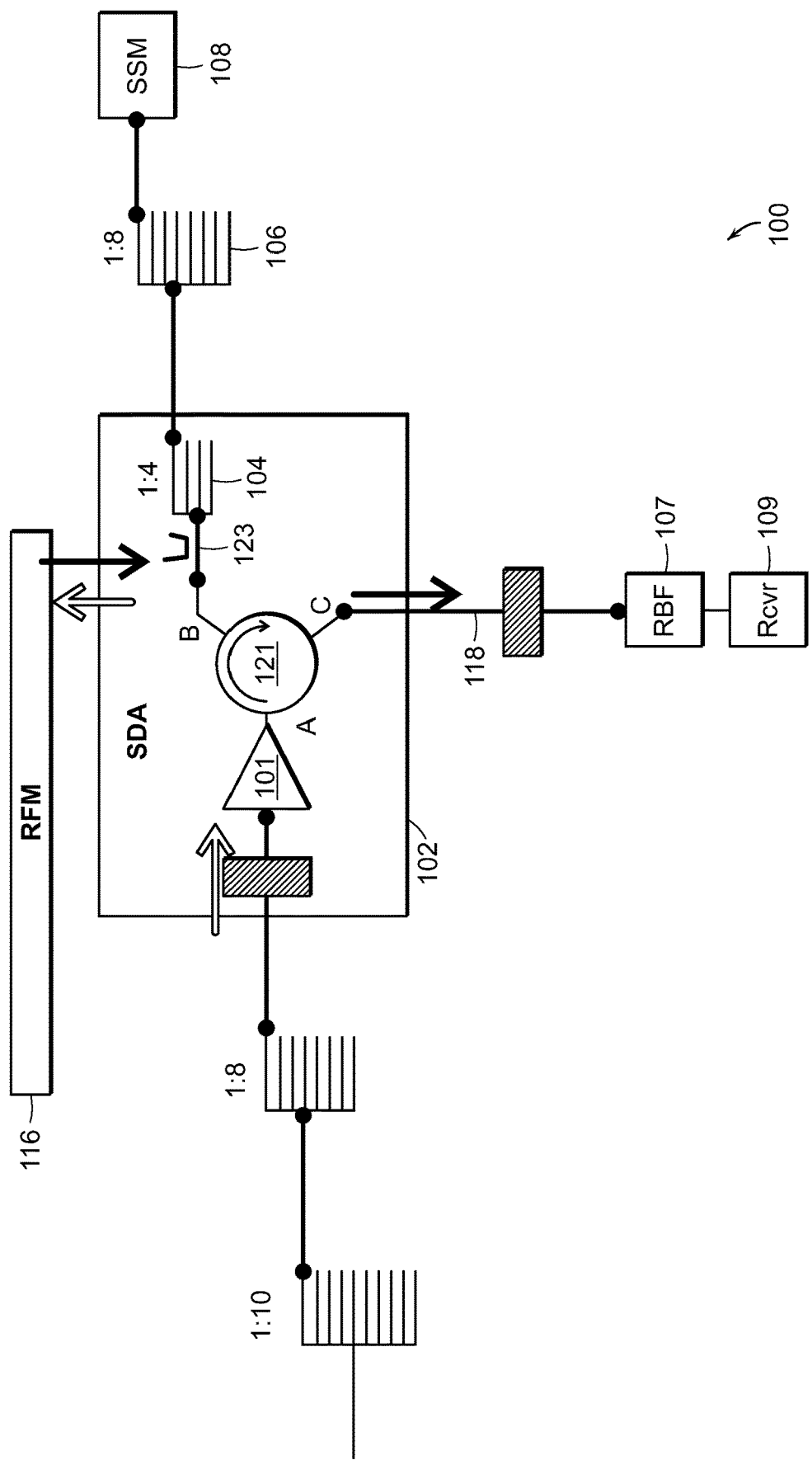
FIG. 1 is a schematic diagram of a PRIOR ART ultra high frequency (UHF) early warning radar (EWR) system.

The disclosed calibration method takes RF measurements automatically and automatically calculates corrections to be implemented for the calibration. Time domain reflectometry (TDR) is used to determine sub-array to sub-array transmit variation in a radar system. Sub-array variation in the receive path of the radar system can then be measured. According to an aspect of the present disclosure, direct measurement of each antenna element is then performed to determine element to element variation through an internal module loop and calibrated delay line. According to another aspect of the present disclosure, both sub-array calibration and element calibration utilize respective delay lines to isolate the internal leakage and reflections in the radar system. The present disclosure also describes a method to overcome the thermal variability of the delay lines. Low side lobe wideband LFM waveforms are utilized in the calibration process. The disclosed calibration method improves overall beam steering accuracy by 70% over conventional calibration methods and improves sensitivity by 0.5 dB due to reduced errors.

Sub-Array Calibration

According to an aspect of the present disclosure time domain reflectometry (TDR) is used in a sub-array level calibration process to establish a transmit sub-array path length. TDR is a commonly used technique for point to point RF measurement. TDR techniques are commonly used for RF cable matching in various RF networks to measure transmission path lengths for electronic signals, for example. TDR measurements are performed by sending a measurement signal along a transmission path to measure the electronic length of the transmission path based on the timing of a reflected signal. The resolution of distance measurements using TDR is proportional to the bandwidth of the measurement signal. Thus an impulse function, which ideally has an infinitely wide bandwidth, may be used as a TDR measurement signal to provide high resolution measurements of transmission path lengths.

The disclosed calibration method and apparatus implements an iterative process in which a length is found for a first path. Then the path length of the first path is used to take more measurements to find the path lengths of other paths. For example, according to the present disclosure, after the sub-array transmit path length is established, a sub-array receive path length is determined. Once the receive path is determined at the sub-array level, the lengths of individual elements serviced by a sub-array can be determined.

Element Level Calibration

According to an aspect of the present disclosure, in the element-level calibration process, each path of a 32 element sub-array is measured through a calibration loop, which is contained in the solid state module transmit/receive module (SSM) of each sub-array element. The disclosed method and apparatus for element level calibration permits the isolation of the measurement signals from leakage signals. A delay line of 5 µs is placed within the calibration loop of the module, and a 1.5 MHz LFM waveform is used for the measurement. This provides enough separation of the return from the module, and circulator leakage within the SDA to make an accurate measurement. The disclosed methods also permit compensation for thermal variability by incorporating a second switched delay of 2.5 µs in the calibration loop. By measuring both delays, thermal variation can be removed as needed. In the element level calibration steps, measurements are made through the transmit and receive portions of the SSM and compared with the calibration loop. Adjustments are then made as needed based on the compared measurements.

Upgrades to the present radar systems include circuitry to perform distributed beam steering, in which elements are commanded individually for each radar waveform. This permits application of calibration coefficients to the steering command of the element. This capability enables the disclosed calibration method to be performed automatically and allows the disclosed automatic corrections to be applied digitally.

Figure 2:
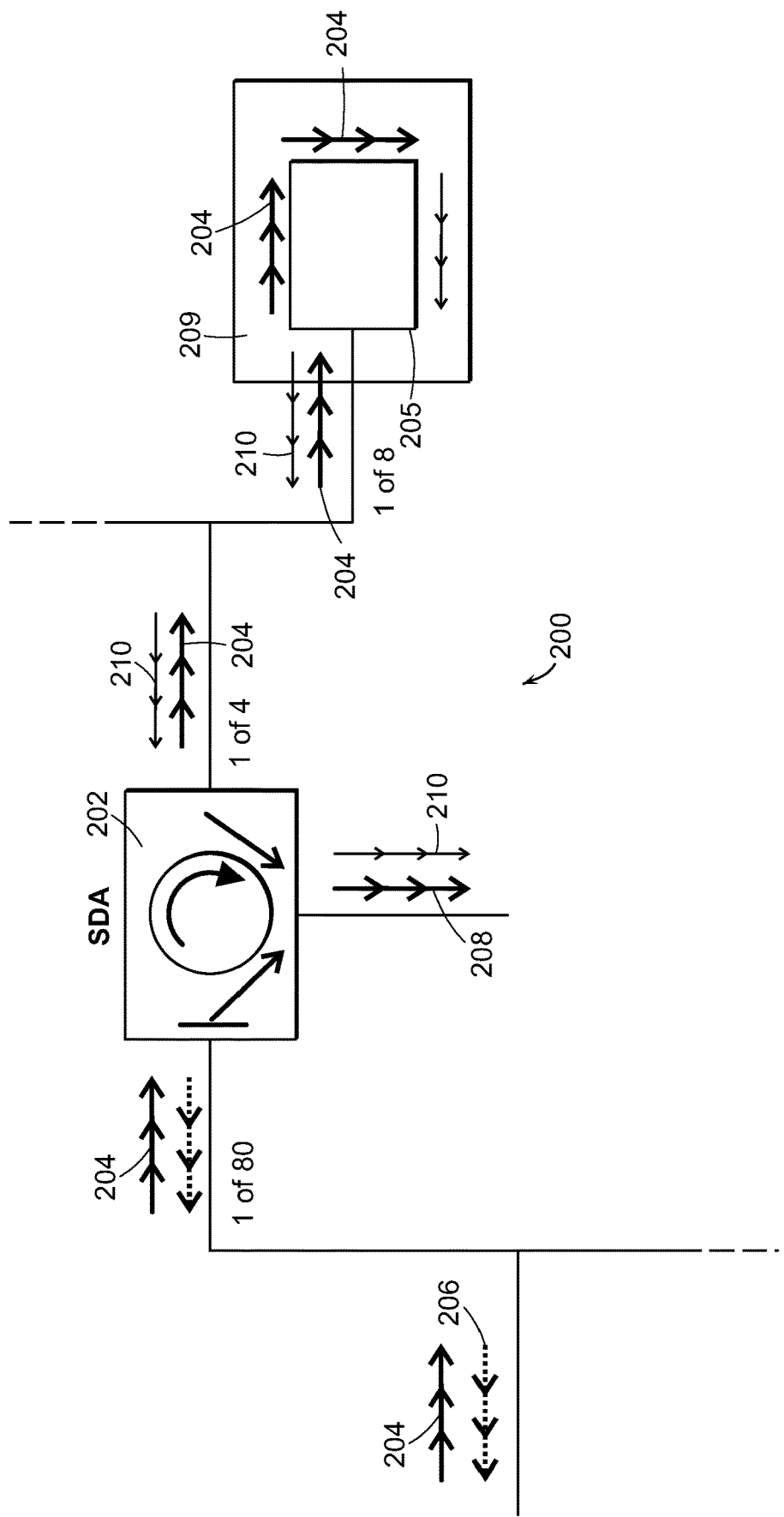
FIG. 2 is a schematic diagram illustrating calibration paths of an excitation signal according to an aspect of the present disclosure.

FIG. 2 is a block diagram illustrating a method and apparatus for calibrating radar systems 200 according to an aspect of the present disclosure. The disclosed radar/calibration system 200 includes a modified sub-array driver assembly (SDA) 202. The modified SDA 202 does not include the amplifier driver circuitry 101 that is included in the previous SDA 102 (FIG. 1). Rather, according to aspects of the present disclosure, amplifier circuitry is included in the individual SSMs 209 of the radar 200/calibration system. The modified SDA 202 allows multiple measurements to be performed automatically.

According to an aspect of the present disclosure, an exciter signal 204 is injected into all of the 80 sub-arrays. In a transmit sub-array calibration process, the exciter signal 204 is reflected from the SDA 202. The reflections 206 back from the SDA 202 are then measured using time domain reflectometry. Another series of measurements are then performed to measure the receive paths. The exciter signal 204 is directed through the SDA 202 to a receive path as a receive sub-array calibration signal 208. A set of switches in the SDA 202 direct injected signals so that all of the path lengths can be measured. Element level calibration is performed by directing the exciter signal 204 through the SDA 202 and around a reference loop 205 as an element level calibration signal 210 for each element. Element level calibration is performed for the receive path and transmit path for each element.

Thus, the disclosed calibration method includes a sequence of measurements to calibrate different paths in the radar. First a transmit calibration path is measured using TDR. Then the receive paths are measured by injecting the signal and separating out the receive signal of interest from leakage paths in the sub-array driver.

Figure 3:
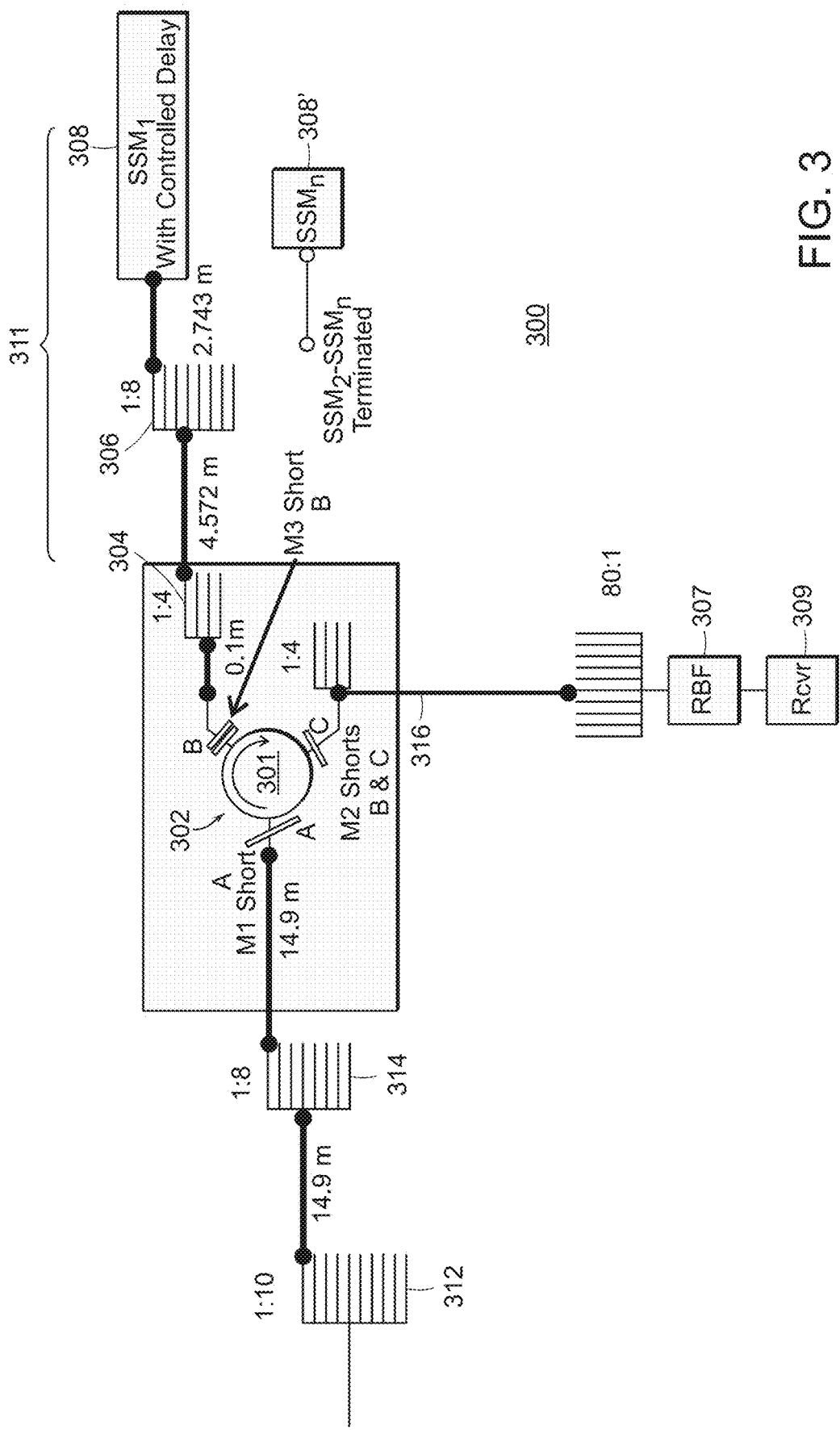
FIG. 3 is a schematic diagram of a UHF EWR system including a plurality of signal paths for calibration according to aspects of the present disclosure.

Referring to FIG. 3, the disclosed radar calibration system 300 includes a plurality of sub-arrays. Each sub-array includes a sub-array driver assembly (SDA) 302. Each SDA 302 includes a number of separate front end lines 304. Each of the front end lines 304 is coupled to a number of separate solid state module lines 306. Each of the solid state module lines is coupled to a solid state module (SSM) 308, 308'.

According to an aspect of the present disclosure, each SDA 302 also includes a number of separate receive path lines 316. Each of the receive path lines 316 are coupled to receive beam former (RBF) circuitry 307 and receiver circuitry 309.

Each of the sub-arrays is coupled to control circuitry (not shown) via a number of sub-array lines. The sub-array lines are arranged in tiers. Each of ten first tier sub-array lines 312 are distributed to eight second tier sub-array lines 314. Each of the second tier sub-array lines 314 are connected to a respective SDA 302. This allows the array to consist of up to 80 sub-arrays. SDAs support 32 elements each. The SDAs contain 4 outputs each and each output is connected to an 8:1 combiner/divider for a total of 32 RF terminals. A set of switches in the SDA 302 direct injected signals so that all of the transmit and receive path lengths can be measured.

In the disclosed radar systems 300, the SDA 302 for each sub array and front end portion 311, including SSMs 308, can be calibrated automatically while installed in the radar system 300. Moreover, in the disclosed calibration method and apparatus, no external calibration hardware such as RF Monitor Injection Method (RFM) is needed for calibration of the radar.

One problem with measuring sub-array line lengths arises because reflected signals from other sub-arrays in a network can interfere with measurements of a individual sub-arrays. Even when the other sub-arrays in the network are terminated with passive loads, and even when all of the signal transmission lines to the other sub-arrays are electrically matched, a small amount of reflectivity is returned from each sub-array. In radar systems that include a large number of sub-arrays, the small reflected signals from each sub-array are added together and can mask the stronger reflection from the sub-array being measured. According to aspects of the present disclosure, enough time delay is provided by the short in so that it is separated from the time delay of all the matched returns that are matched.

Referring to Table 1 and FIGS. 4-9, according to an aspect of the present disclosure, the disclosed calibration method includes a sequence of measurements, labeled M1-M6.

TABLE 1

| Meas # | BW | Description |
| --- | --- | --- |
| M1 | 30 MHz | Round Trip Sub-array Transmit Phase To SDA using TDR: |
| M2 | 30 MHz | Round trip sub-array transmit phase to SDA through Circulator with Shorts at Terms C and B: Ci. Short is 45 ns delay one way. |
| M3 | 30 MHz | Sub-array Receive Phase From SDA to |

TABLE 1-continued

| Meas # | BW | Description |
| --- | --- | --- |
|  |  | RBF/RCVR: L2, Short at B. Short is 45 ns delay one way |
| M4 | 1.5 MHz | Transmit and Receive Phase From SDA to SSM: L3 |
| M5 | 1.5 MHz | Receive SSM Alignment |
| M6 | 1.5 MHz | Transmit SSM Alignment |

In a first measurement (M1) a 30 MHz exciter signal is injected to the SDA 302. A short circuit (labeled M1 short) is configured at an input of the SDA 302 (terminal A of the circulator 301) to reflect the exciter signal. The transmit path length from the exciter is measured using time domain reflectometry (TDR) in response to the 30 MHz exciter signal.

Figure 4:
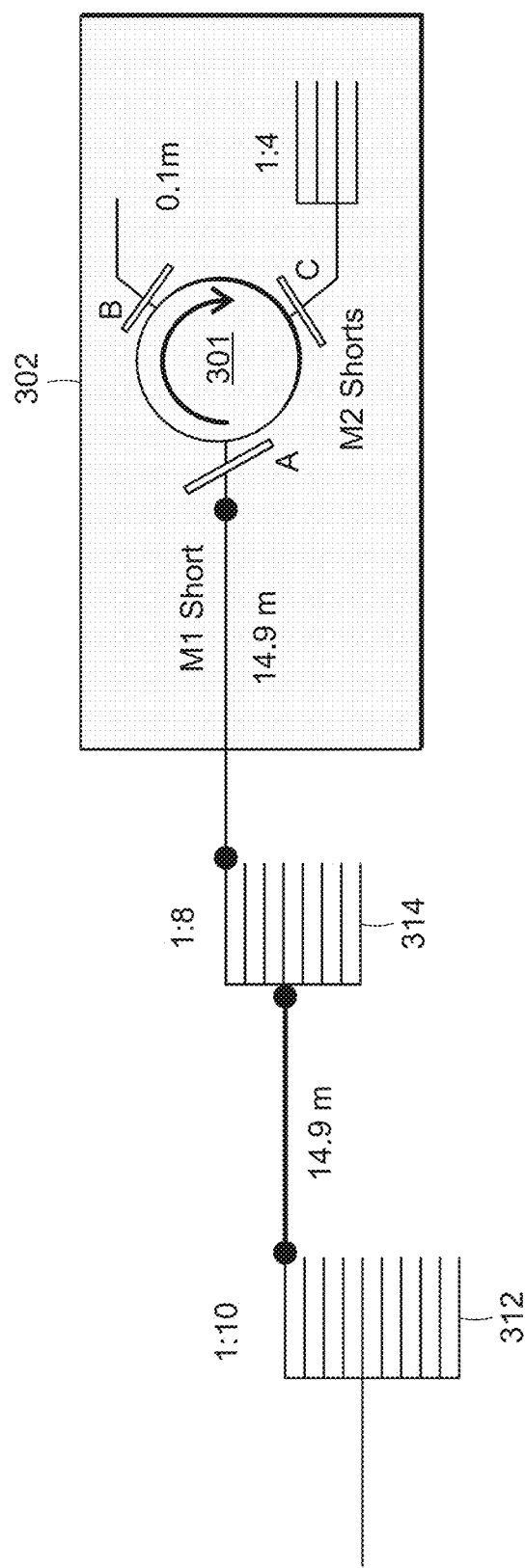
FIG. 4 is a schematic diagram of transmit path between a radar input port and through a circulator of a sub-array driver module in the radar for calibrating the radar according to an aspect of the present disclosure.
Figure 5:
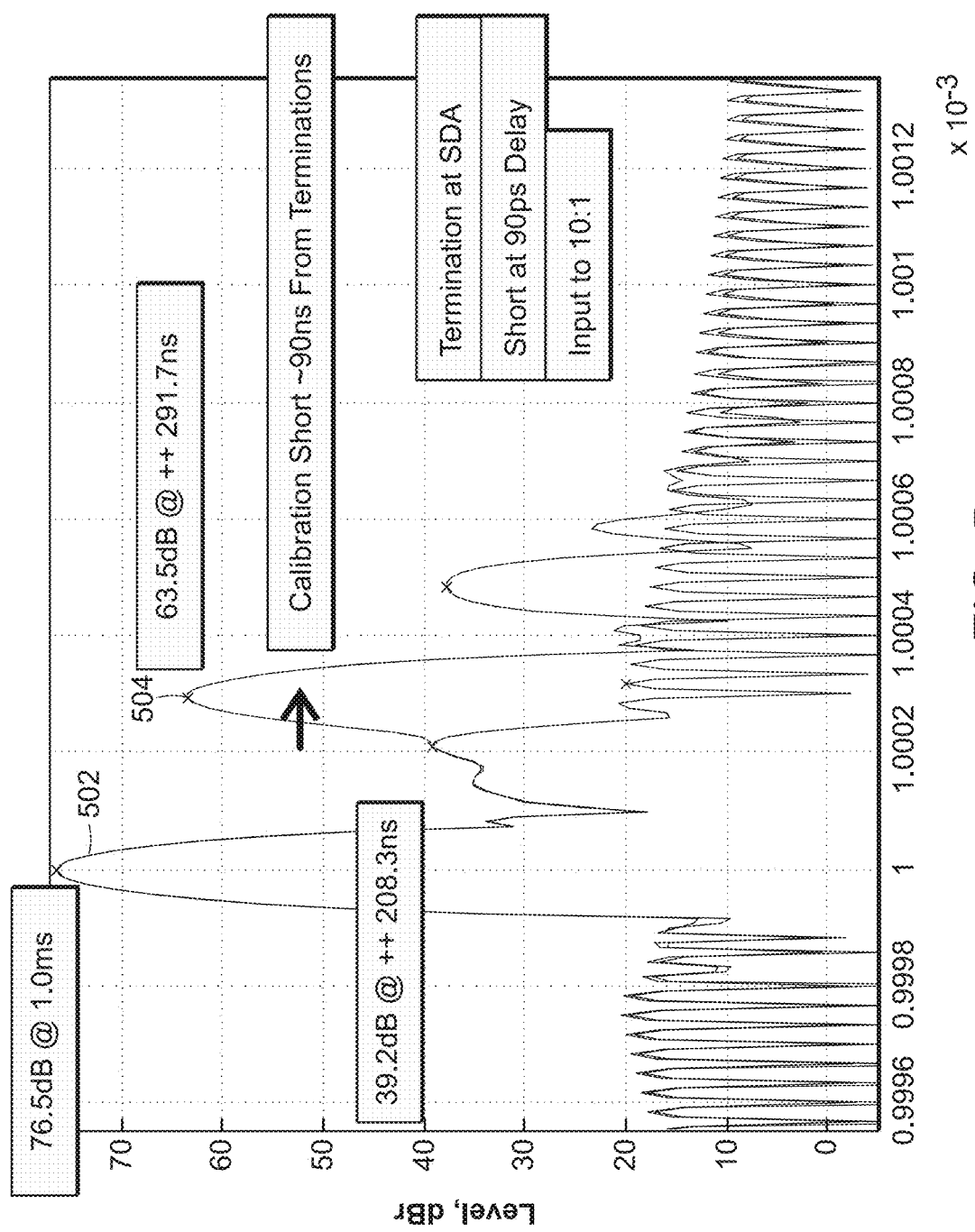
FIG. 5 is a graph representing a calibration signal of a measured path between a radar input port and through a circulator of a sub-array driver module in the radar, which is distinguishable by a delay with respect to reflected signals in other paths of the radar according to an aspect of the present disclosure.

FIG. 4 is a schematic diagram for measuring the transmit path in a second measurement, M2. In the second measurement M2, a round trip TDR sub-array transmit phase is measured through the SDA 302. In the second measurement M2, the 30 MHz exciter signal passes through a circulator 301 in the SDA 302. Terminals C and B of the circulator are terminated with short circuits. The short circuits are configured to inject a delay of 45 ns in one direction. According to an aspect of the present disclosure, the time delays in the circulator portion of the SDA 302 allow a distinction to be made between reflections that come back from different sub-arrays. Thus, the short facilitates measurement of the path length for each of the 80 sub-arrays individually. The short is installed in the SDA of the sub-array being measured. All of the other sub-arrays are match loaded. This is performed separately for each SDA to calculate the lengths for each one of the 80 sub-array transmit paths. FIG. 5 is a graph showing separation between a measurement signal 502 on the transmit path being measured, and reflected signals 504 from the other sub-arrays.

Figure 6:
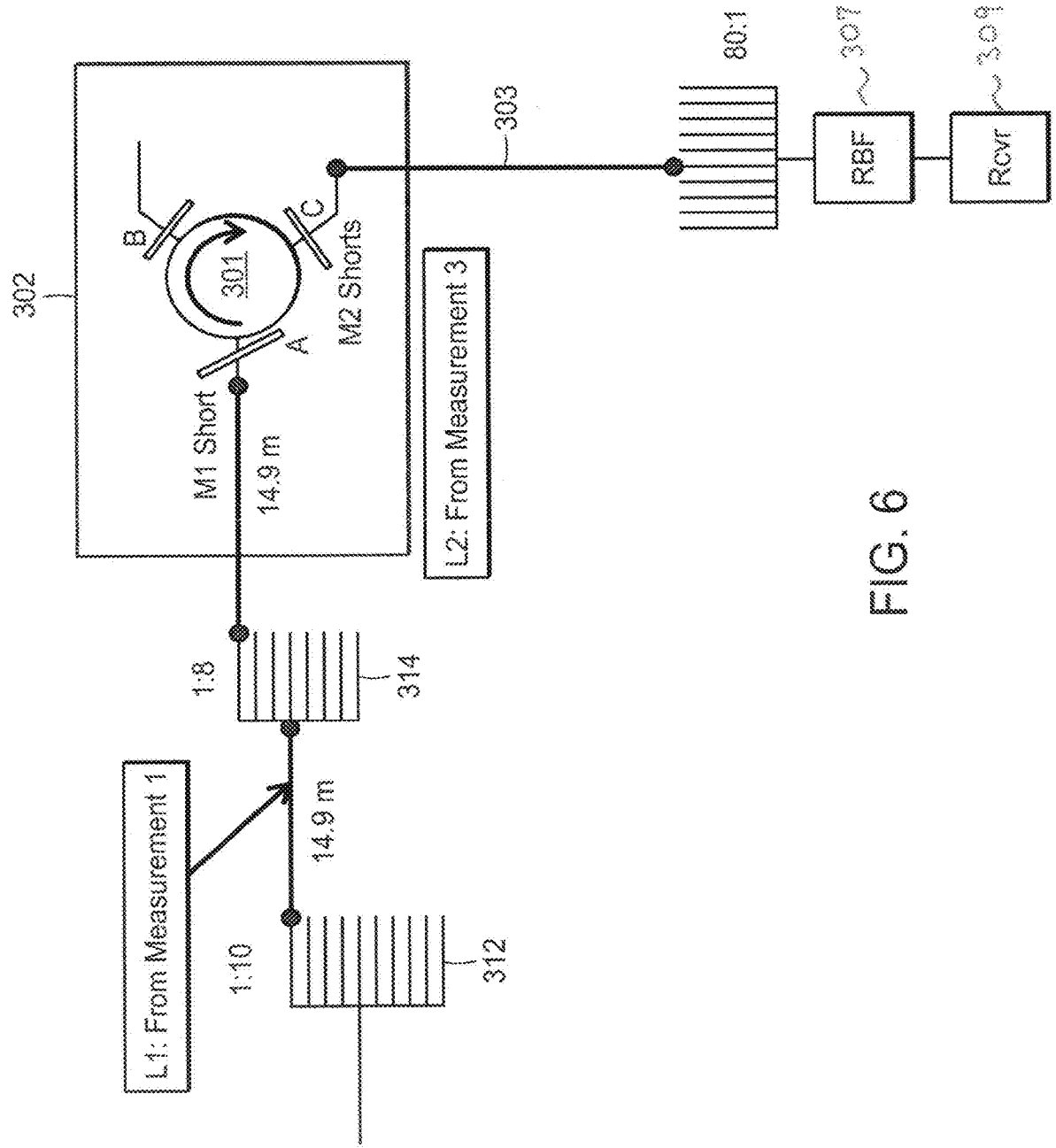
FIG. 6 is a schematic diagram of a sub-array receive path from a sub-array driver module to receiver circuitry in the radar for calibrating the radar according to an aspect of the present disclosure.
Figure 7:
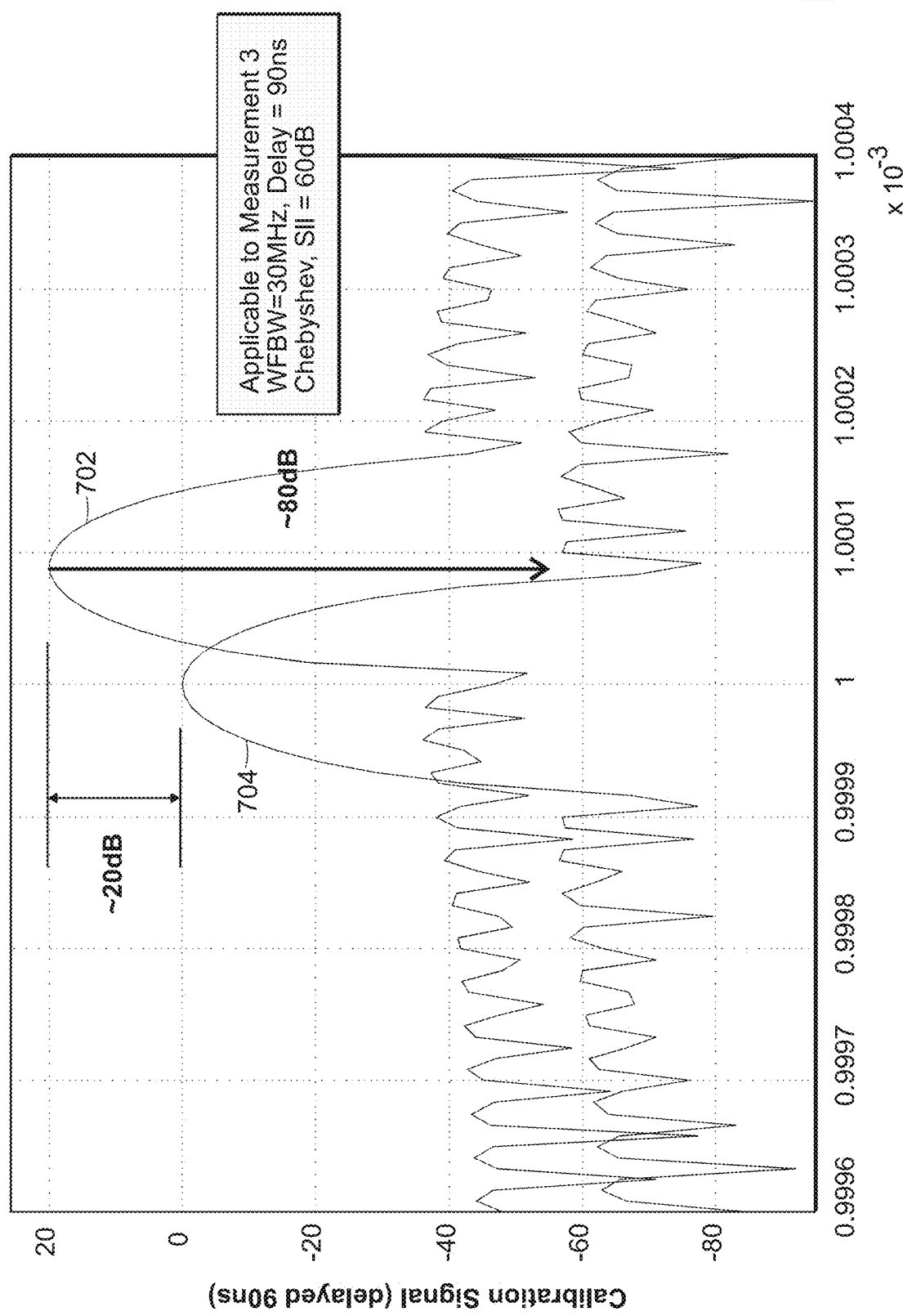
FIG. 7 is a graph representing a calibration signal of a measured sub-array receive path from a sub-array driver module to receiver circuitry in the radar, which is distinguishable by a delay with respect to reflected signals in other paths of the radar according to an aspect of the present disclosure.

Referring to FIG. 6, in a third measurement M3 the 30 MHz exciter signal is used to measure the sub-array receive path from the SDA to receiver beam former (RBF) 307 and receiver circuitry 309 for each sub-array. In the third measurement M3, a short is configured at terminal B of the circulator 301 in the SDA 302. This directs the transmit signal to the radar receiver. Since the delay of the circulator is known from M2, the length of the path between the SDA and the receiver is now determined. The terminal B short provides a 45 ns (one way) delay. FIG. 7 is a graph showing the delayed receive path measurement 702 which can be distinguished from direct leakage 704 through the circulator) from reflections on the other lines, for example.

Figure 8:
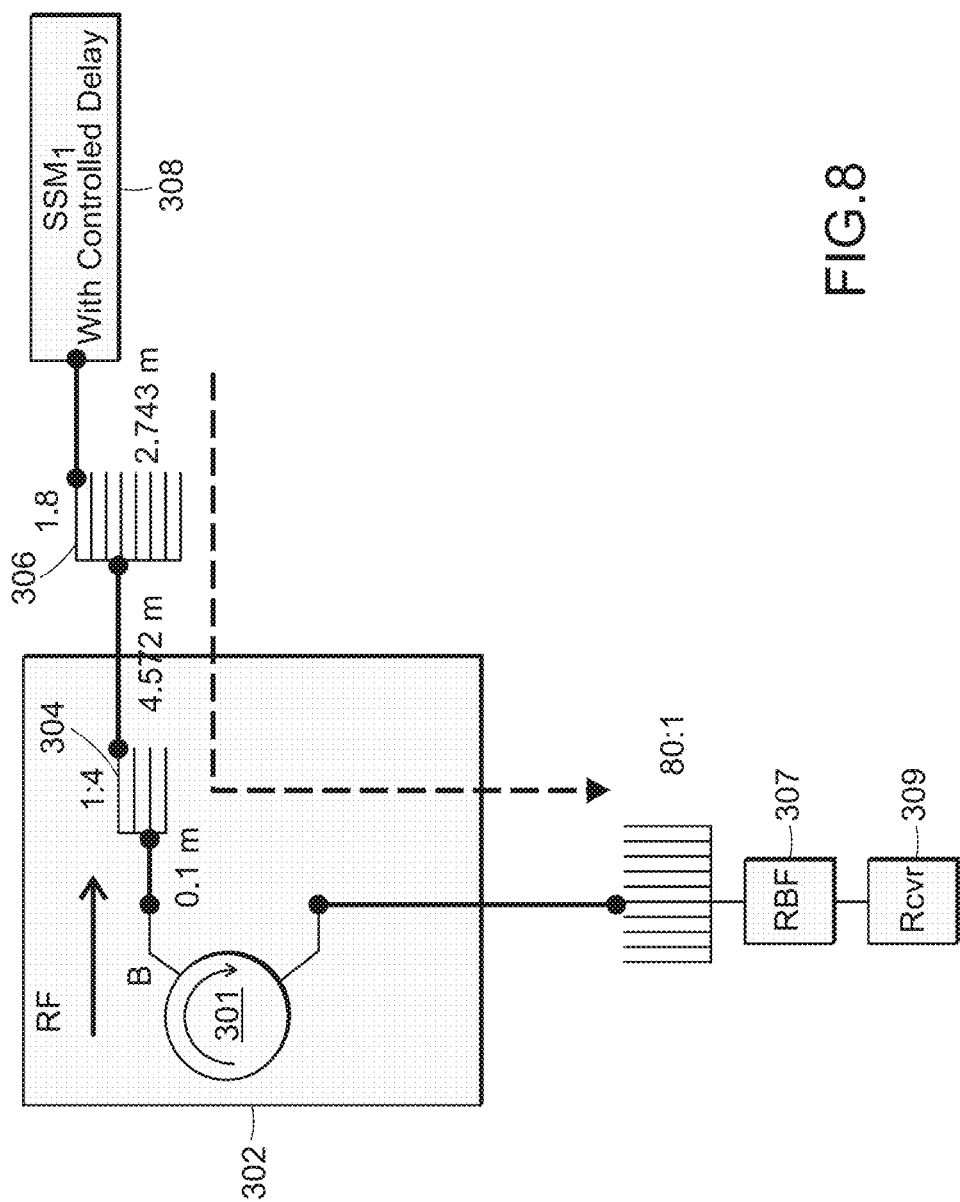
FIG. 8 is a schematic diagram of a transmit and receive path from a sub-array driver module to an array element module in the radar for calibrating the radar according to an aspect of the present disclosure.
Figure 9:
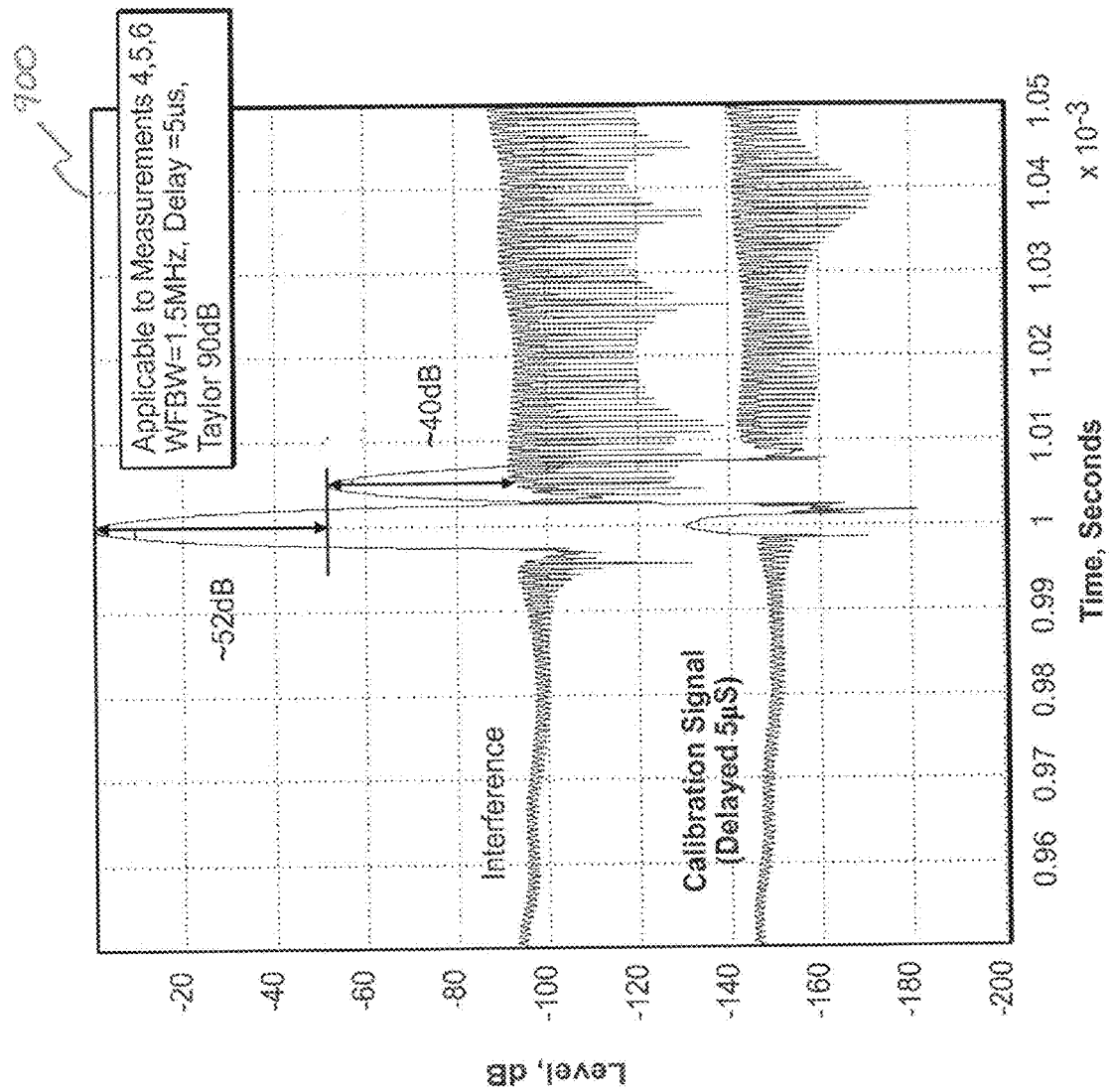
FIG. 9 is a graph representing a calibration signal of a transmit and receive path from a sub-array driver module to an array element module in the radar, which is distinguishable by a delay with respect to reflected signals in other paths of the radar according to an aspect of the present disclosure.

Referring to FIG. 8, in a fourth measurement M4 a 1.5 MHz exciter signal is injected to measure transmit and receive paths from the SDA 302 to each SSM 308. This is accomplished with a known passive calibration loop within the SSM. The transmit and receive paths are measured from the SDA 302 to each SSM 308 by injecting the 1.5 MHz signal into the SDA 302. This measurement does not use time domain reflectivity as the calibration loop is a matched circuit. Nonetheless, because there is finite isolation in the circulator 301, a delay line for the receive calibration measurement is implemented to separate the circulator return (i.e., the direct return from the RF injection) from the return on each SSM path being measured. In the example shown, the 1.5 MHz signal path extends through a 1:4 first tier of dividers/combiners then through a 1:8 second tier of dividers/combiners into a corresponding SSM 308. According to an aspect of the present disclosure, a controlled and calibrated delay is installed in each SSM 308, so when the signal comes back, it can be distinguished from direct circulator return from the RF injection on sub array driver leakage paths. The fourth measurement is performed in sequence on a receive path for each individual SSM 308. FIG. 9 is a graph 900 representing a calibration signal of a transmit and receive path from a sub-array driver module to an array element module in the radar, which is distinguishable by a delay with respect to reflected signals in other paths of the radar according to an aspect of the present disclosure.

A fifth calibration step M5, and sixth calibration step M6 constitute element level calibration. In the fifth calibration step, M5 the SSM receive path is aligned for each of the SSMs 308 using the 1.5 MHz signal. In the sixth calibration step M6, the SSM transmit path is aligned for each of the SSMs using the 1.5 MHz signal.

Figure 10:
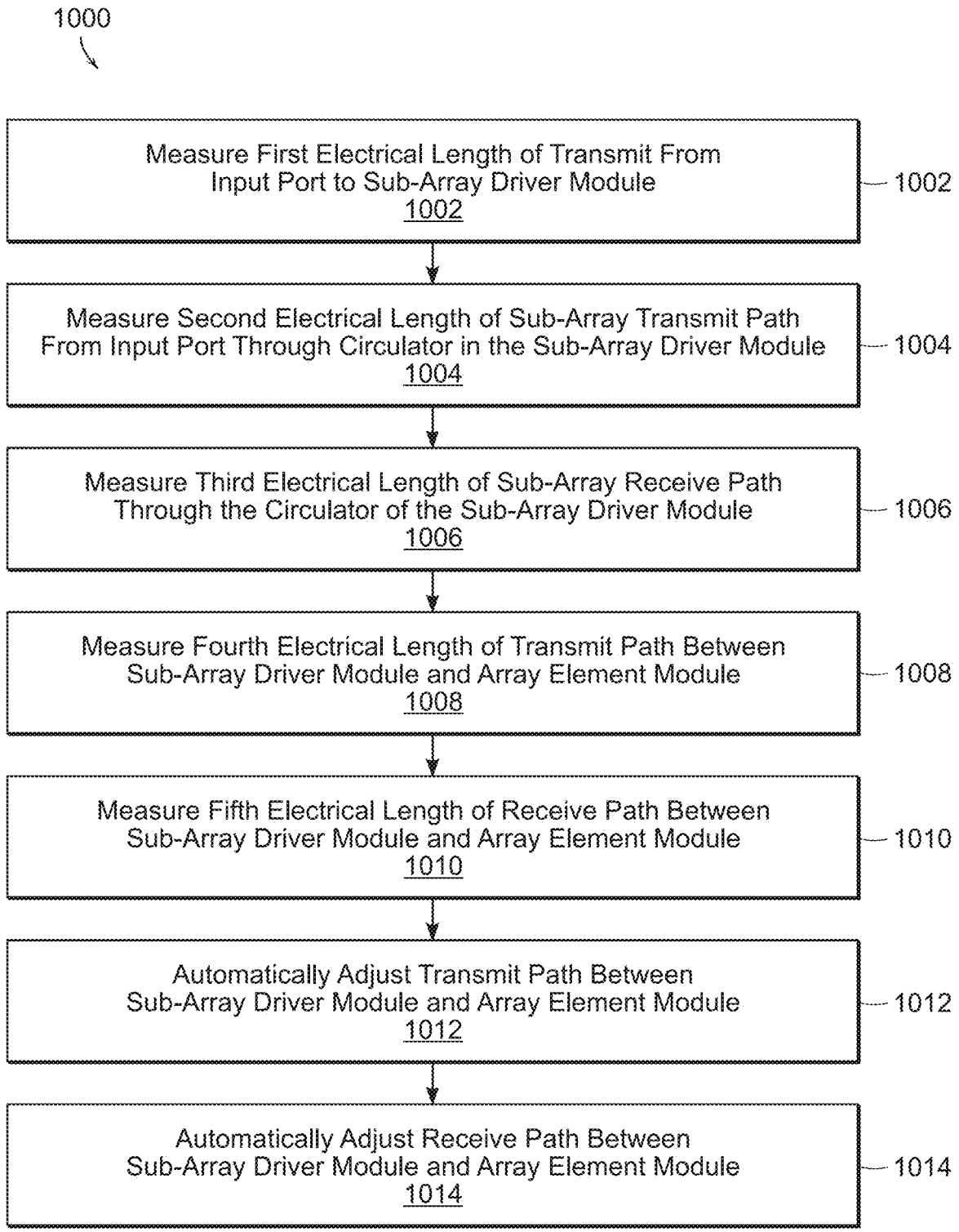
FIG. 10 is a process flow diagram illustrating a method for calibrating a radar according to an aspect of the present disclosure.

Table 2, shows the math that is used to perform measurements M1-M4 and calibration steps M5-M6 according to an aspect of the present disclosure. According to an aspect of the present disclosure, error budgets are calculated using realistic reflection coefficients. In the disclosed sequence of measurements and calibration steps, each measurement following M1 includes computations or adjustments based on a previous measurement.

to FIG. 10. The method 1000 includes measuring a first electrical length in the radar apparatus of a sub-array transmit path from a first radar input port to a sub-array driver module using time domain reflectometry in block 1002. Block 1004 includes measuring a second electrical length in the radar apparatus of the sub-array transmit path from the first radar signal input port through a circulator in the sub-array driver using time domain reflectometry. Block 1006 includes measuring a third electrical length in the radar apparatus of a sub-array receive path from the first radar input port through the circulator in the sub-array driver module to receiver circuitry. The results of the first and second measurements permit computation of the receiver length from the SDA terminal to the radar receiver. Once this is done, the lengths beyond the subarray driver can be measured. Block 1008 includes measuring a fourth electrical length in the radar apparatus of a transmit path between the sub-array driver module and an array element module of the radar via the SSM calibration loop. Block 1010 includes measuring a fifth electrical length in the radar apparatus of a receive path between the sub-array driver module and the array element module of the radar through the receive path of the SSM. Block 1012 includes adjusting the transmit path between the sub-array driver module and the array element module by controlling a phase shift in the array element

TABLE 2

| M # | Description | SINR | Phase | Target | Method & Error Sources |
|---|---|---|---|---|---|
| 1 | Subarray Transmit Phase To SDA using TDR: 2*L1 + 2D_sda | 44 dB | 0.1 | L1 | L1 = 0.5*{M1} − D_sda. L1 Error: RSS(.5M1, D_sda) |
| 2 | Subarray Transmit Phase with circulator to SDA using TDR: 2*{L1 + Ci} + 2D_sda | 44 dB | 0.1 | Ci | Ci = 0.5*{M2} − 0.5*M1, C Errors: RSS(.5M1, .5M2, D_sda, Ci_sigma) |
| 3 | Path from transmit to recv via circulator. L1 + Ci + L2 | 55 dB | 0.1 | L2 | L2 = {M3} − L1-Ci, L2 Errors: RSS(M3, .L1, Ci_sigma) |
| 4 | Path from L1 + Ci + L3 + D_cal + L3 + Ci + L2 | 40 dB | 0.4 | L3 | L3 = 0.5*[{M4} − {M3}-Ci-D_cal], L3 Errors: RSS(.5M4, .5M3, Ci_sigma, D_cal} |
| 5 | L1 + Ci + L3 + D_rx + L3 + Ci + L2 | 40 dB | 0.4 | D_rx | D_rx = {M5} − {M4}, D_rx Errors: RSS(M5, M4, D_cal); |
| 6 | L1 + Ci + L3 + D_tx + L3 + Ci + L2 | 40 dB | 0.4 | D_tx | D_tx = {M6} − {M4}, D_tx Errors: RSS(M6, M4, D_cal); |

TABLE 3

| | Method and Error Source | Deg, RMS |
|---|---|---|
| D_cal | Computed from two 40 dB SINR measurements | 0.5° |
| D_sda | 90 ns two way delay held constant to within 8.5 ps/deg with measured uncertainty of 0.5° | 1° |
| Ci_sigma | Manufacturing tolerance estimate - similarity from port to port. | 1° |

Table 3 show that the disclosed method and apparatus provides improved calibration accuracy. The disclosed method and apparatus is more accurate than existing systems and facilitates calibrating all sub-arrays and all SSMs and elements of a phased array radar. Moreover, the disclosed method and apparatus facilitates automatic calibration of radar systems and supports future improvements including implementation of digital beam forming techniques. The disclosed calibration method and apparatus substantially reduces the amount of calibration specific hardware that is needed to calibrate radar systems. The disclosed method and apparatus also supports growth of radar systems to facilitate digital beam forming architecture.

A method for calibrating a radar apparatus according to an aspect of the present disclosure is described with reference module via the transmit path of the SSM. Block 1014 includes adjusting the receive path between the sub-array driver module and the array element module by controlling the phase in the array element module.

Figure 11:
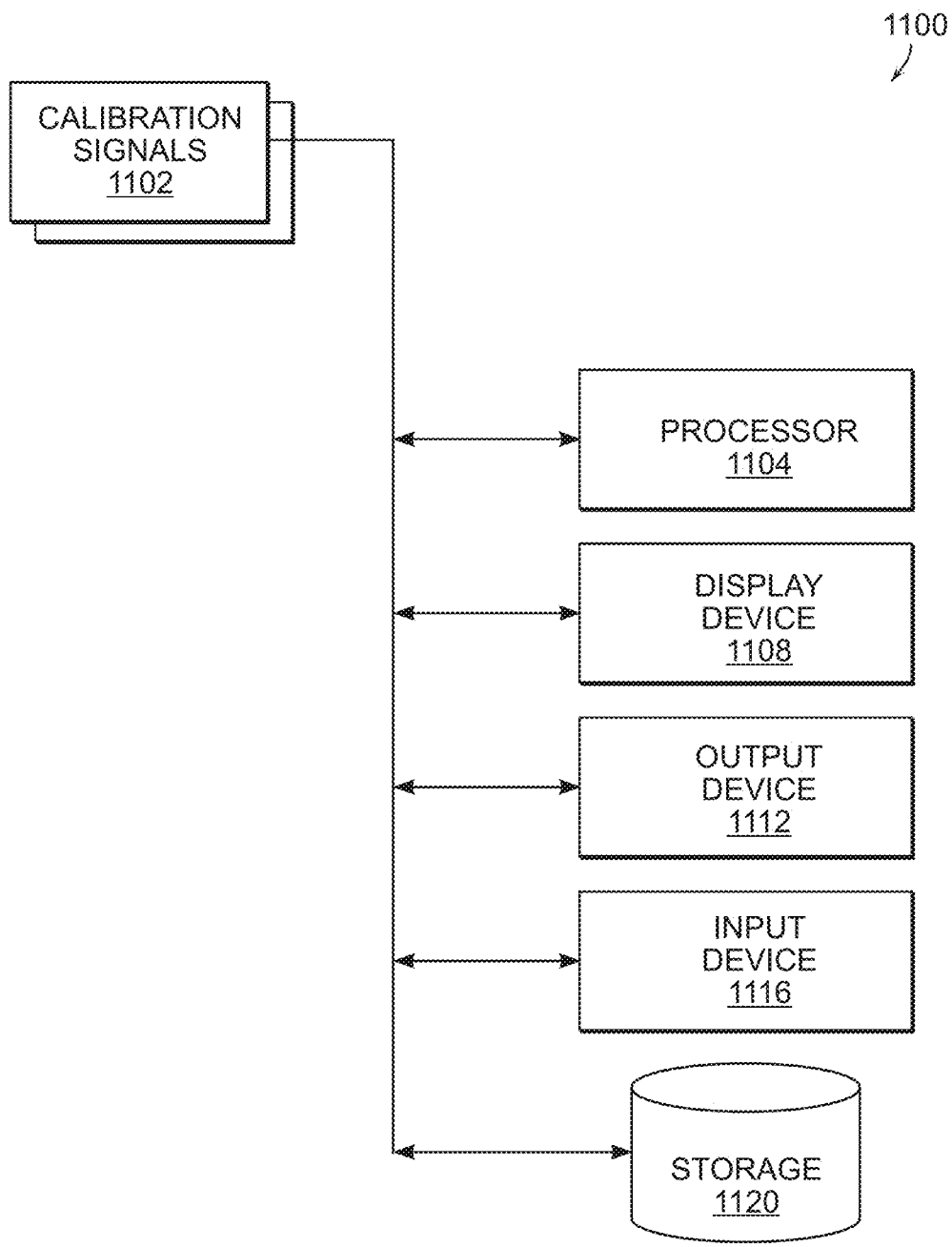
FIG. 11 is a schematic illustration of a system calibrating a radar, in accordance with an example embodiment of the present disclosure.

FIG. 11 is a schematic illustration of a system 1100 for processing radar calibration signals 1102, according to an embodiment of the present disclosure. The system 1100 may be coupled to the radar input port, for example, and includes a processor 1104 for processing the calibration signals 1102. The processor 1104 stores a variety of information about the calibration signals 1102 and the system 1100. The storage device 1120 can include a plurality of storage devices. The storage device 1120 can include, for example, long-term storage (e.g., a hard drive, a tape storage device, flash memory), short-term storage (e.g., a random access memory, a graphics memory), and/or any other type of computer readable storage. The various components and modules that make up the system 1100 may be part of a radar system that can be used for tactical operations, for example.

The modules and devices described herein can, for example, utilize the processor 1104 to execute computer executable instructions and/or include a processor to execute computer executable instructions (e.g., an encryption processing unit, a field programmable gate array processing unit). It should be understood that the system 1100 can include, for example, other modules, devices, and/or processors known in the art and/or varieties of the illustrated modules, devices, and/or processors.

The input device 1116 receives information associated with the system 1100 (e.g., instructions from a user, instructions from another computing device) from a user (not shown) and/or another computing system (not shown). The input device 1116 can include, for example, a keyboard, scanner or mouse. The output device 1112 outputs information associated with the system 1100 (e.g., information to a printer (not shown), information to an audio speaker (not shown)).

The optional display device 1108 displays information associated with the system 1100 (e.g., status information, configuration information). The processor 1104 executes the operating system and/or any other computer executable instructions for the system 1100.

Figure 12:
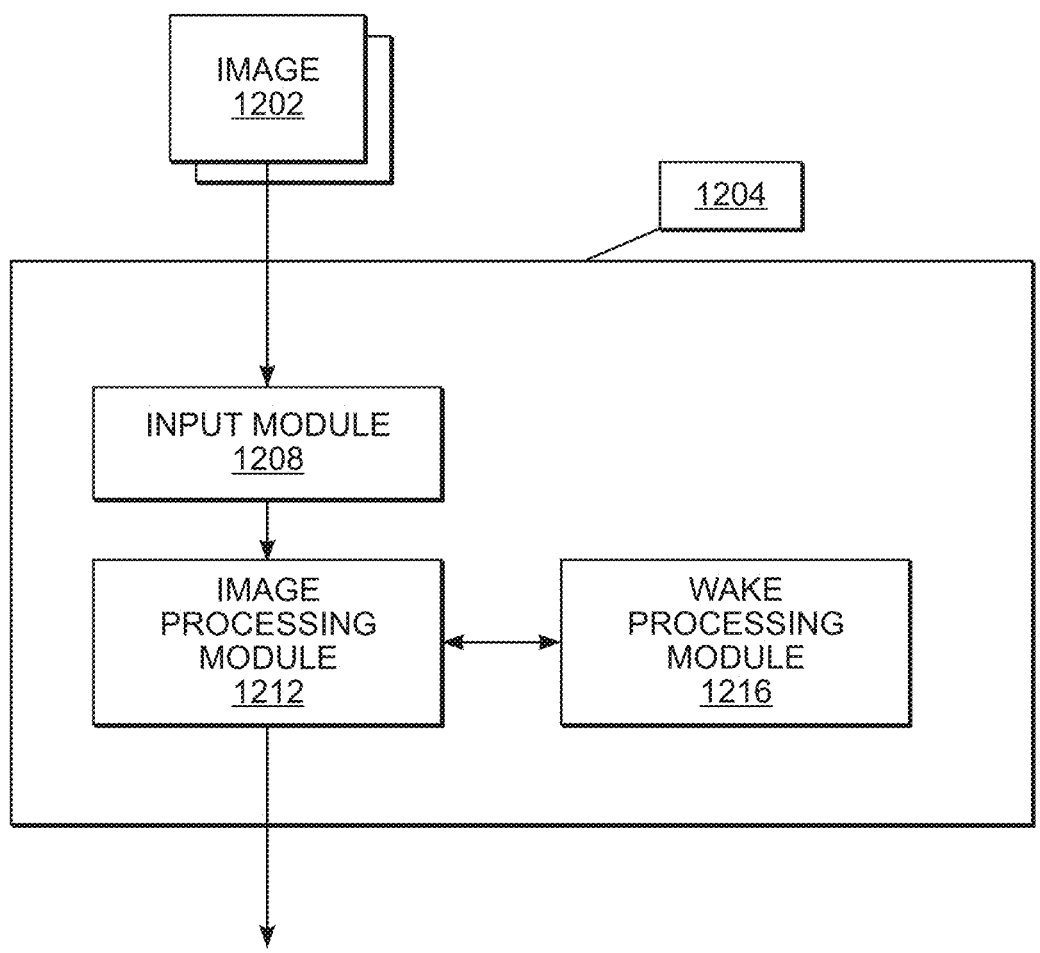
FIG. 12 is a schematic illustration of exemplary modules implemented in a processor accordance with an example embodiment of the present disclosure.

FIG. 12 is a schematic illustration of exemplary modules implemented in a processor 1204, according to an embodiment. In one embodiment, the processor 1204 is used as the processor 1104 of FIG. 11 to implement the methods disclosed herein. The processor 1204 includes an input module 1208, measurement processing module 1212, and a calibration adjustment processing module 1216. The input module 1208 receives reflected calibration signals 1202 and provides the information about the calibration signals to the measurement processing module 1212 and calibration adjustment processing module, for example.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include (and can be operatively coupled to receive data from and/or transfer data to) one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry® device or Apple® iPad device.

The terms 'comprise', 'include', and/or plural forms of each as used herein are open ended and include the listed parts and can include additional parts that are not listed. The term 'and/or' as used herein is open ended and includes one or more of the listed parts and combinations of the listed parts.

One skilled in the art will realize the aspects disclosed herein may be embodied in other specific forms without departing from the spirit or essential characteristics thereof. The foregoing embodiments are therefore to be considered in all respects illustrative rather than limiting of the aspects described herein.

The teachings of all patents, published applications and references cited herein are incorporated by reference in their entirety.

While the present disclosure has been particularly shown and described with references to example embodiments thereof, it will be understood by those skilled in the art that various changes in form and details may be made therein without departing from the scope of the present disclosure encompassed by the appended claims.

What is claimed is:

1. An apparatus for calibrating a radar, having the apparatus comprising a plurality of sub-arrays, wherein at least one of the sub-arrays comprises:
    a respective sub-array driver module coupled to an input port of the radar;
    a plurality of solid state modules coupled to the respective sub-array driver module;
    a controllable delay in each of the plurality of solid state modules;
    a circulator in the respective sub-array driver module;
    a first controllable short circuit in the circulator, the first controllable short circuit configured for terminating a first transmission line between the input port and the sub-array driver module;
    a second controllable short in the circulator, the second controllable short configured for terminating a second transmission line between the sub-array driver module and a selected one of the plurality of array element modules, the second controllable short configured for providing a first delay; and
    a third controllable short in the circulator, the third controllable short configured for terminating a third transmission line between the sub-array driver module and a receiver circuit, the third controllable short configured for providing a second delay.

2. The apparatus of claim 1, wherein the at least one of the sub-arrays comprises:
    a sub-array transmit path from the input port to a first terminal of the circulator in the respective sub-array driver module, the first terminal located between the first radar input port and the circulator.

3. The apparatus of claim 2, wherein the at least one of the sub-arrays comprises:
    a sub-array transmit path from a first radar signal input port through the circulator via the first terminal of the circulator.

4. The apparatus of claim 2, wherein the at least one of the sub-arrays comprises:
    a sub-array receive path from the first radar input port through the circulator to a receiver circuit.

5. The apparatus of claim 2, wherein the at least one of the sub-arrays comprises:
    a transmit and receive path between the sub-array driver module of the sub-array and each of the solid state modules (SSMs) of the sub-array.

6. The apparatus of claim 5, wherein the at least one of the sub-arrays comprises a passive loop in each of the SSMs.

7. The apparatus of claim 2, wherein the at least one of the sub-arrays comprises:
    a transmit path between the sub-array driver module of the sub-array and each of the solid state modules (SSMs) of the sub-array; and
    a transmit element in each of the SSMs of the sub-array.

8. The apparatus of claim 7, comprising wherein the at least one of the sub-arrays comprises: a phase control circuit in the transmit element of at least one of the SSMs.

9. The apparatus of claim 2, wherein the at least one of the sub-arrays comprises:
    a receive path between the sub-array driver module of the sub-array and the each of the solid state modules (SSMs) of the sub-array.

10. The apparatus of claim 9, wherein the at least one of the sub-arrays comprises: a receive element in each of the SSMs of the sub-array.

11. The apparatus of claim 10, wherein the at least one of the sub-arrays comprises: a phase control circuit in the receive element of each of the SSMs of the sub-array.

* * * * *